US012499090B2

(12) United States Patent
Omar et al.

(10) Patent No.: US 12,499,090 B2
(45) Date of Patent: Dec. 16, 2025

(54) SYSTEMS AND METHODS FOR OPTIMIZING DATA FOR A SERVERLESS FILE SYSTEM

(71) Applicant: Capital One Services, LLC, McLean, VA (US)

(72) Inventors: Nour Omar, Hurst, TX (US); Louis Buell, Chevy Chase, MD (US); Donald Gennetten, Henrico, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 18/472,430

(22) Filed: Sep. 22, 2023

(65) Prior Publication Data

US 2025/0103555 A1 Mar. 27, 2025

(51) Int. Cl.
*G06F 16/172* (2019.01)
*G06F 16/16* (2019.01)

(52) U.S. Cl.
CPC .......... *G06F 16/172* (2019.01); *G06F 16/164* (2019.01)

(58) Field of Classification Search
CPC .............................. G06F 16/172; G06F 16/164
USPC ......................................................... 707/822
See application file for complete search history.

(56) References Cited

U.S. PATENT DOCUMENTS

| | | | | |
|---|---|---|---|---|
| 6,992,686 B2 * | 1/2006 | Nagarajan | .......... | H04N 1/00209 382/167 |
| 7,240,060 B2 * | 7/2007 | Adya | .................... | G06F 16/134 707/E17.119 |
| 7,987,342 B1 * | 7/2011 | Thaik | .................... | G06F 9/3802 712/208 |
| 9,158,785 B1 * | 10/2015 | Rudkowski | ......... | H04L 67/1095 |
| 10,452,619 B1 * | 10/2019 | Panghal | ................ | G06F 16/178 |

(Continued)

FOREIGN PATENT DOCUMENTS

| CN | 101263492 A | * | 9/2008 | .......... G06F 16/256 |
|---|---|---|---|---|
| CN | 102479098 A | * | 5/2012 | .......... G06F 9/4401 |

(Continued)

OTHER PUBLICATIONS

Soroka, A., "ML-Based Clang Optimization Passes Selection for Binary Code Size Reduction", 2020 Ivannikov Ispras Open Conference (ISPRAS), 2020, pp. 40-45. (Year: 2020).*

*Primary Examiner* — Phuong Thao Cao
(74) *Attorney, Agent, or Firm* — TROUTMAN PEPPER LOCKE LLP; Christopher J. Forstner; John A. Morrissett

(57) ABSTRACT

Disclosed embodiments may include a system for optimizing data for a serverless file system. The system may receive input data and determine whether the input data is appropriate for optimization. If so, the system may optimize the input data to reduce a size to create optimized data, group the optimized data, apply metadata, versioning, tags, enterprise governance and compliance requirements to the optimized data and store the optimized data in a data repository. In response to receiving an input to upload the optimized data to the serverless file system and determining, from the metadata, that the optimized data is not stored in the serverless file system, the system may upload the optimized data to the serverless file system via an application programming interface. The system may update metadata of the optimized data to indicate a new location at which the optimized data is stored on the serverless file system.

20 Claims, 4 Drawing Sheets

(56) References Cited

U.S. PATENT DOCUMENTS

| | | | |
|---|---|---|---|
| 10,691,638 B1* | 6/2020 | Lyadvinsky | G06F 3/0622 |
| 10,958,732 B1* | 3/2021 | Procopio | H04L 67/10 |
| 11,436,194 B1* | 9/2022 | Salmon | G06F 16/164 |
| 11,526,469 B1* | 12/2022 | Mathews | H03M 7/6058 |
| 12,158,951 B2* | 12/2024 | Saliba | G06F 21/554 |
| 2002/0156946 A1* | 10/2002 | Masters | G06F 3/0656 |
| | | | 710/33 |
| 2005/0275666 A1* | 12/2005 | Nagarajan | H04N 1/00209 |
| | | | 345/660 |
| 2006/0136369 A1* | 6/2006 | Douceur | G06F 16/182 |
| 2007/0168364 A1* | 7/2007 | Douceur | G06F 16/164 |
| 2009/0019392 A1* | 1/2009 | Nomura | G06F 16/54 |
| | | | 715/810 |
| 2009/0070356 A1* | 3/2009 | Mimatsu | H03M 7/30 |
| 2009/0136144 A1* | 5/2009 | Gwak | H04N 19/156 |
| | | | 382/232 |
| 2009/0150876 A1* | 6/2009 | Krebs | G09B 5/06 |
| | | | 717/165 |
| 2009/0307602 A1* | 12/2009 | Brewer | G06Q 10/10 |
| | | | 715/744 |
| 2011/0289092 A1* | 11/2011 | Kumar | G06F 16/2228 |
| | | | 707/741 |
| 2015/0381989 A1* | 12/2015 | Lee | H04N 19/15 |
| | | | 375/240.02 |
| 2016/0239219 A1* | 8/2016 | Lotem | G06F 3/0611 |
| 2018/0034879 A1* | 2/2018 | Chegini | H04L 65/403 |
| 2018/0232160 A1* | 8/2018 | Das | G06F 3/061 |
| 2019/0279234 A1* | 9/2019 | Bagley | G06Q 50/14 |
| 2020/0278803 A1* | 9/2020 | Ichikawa | G06F 3/0673 |
| 2021/0208913 A1* | 7/2021 | Mahadevan | H04L 67/01 |
| 2021/0374253 A1* | 12/2021 | Chen | H04L 9/0897 |
| 2022/0276859 A1* | 9/2022 | Brevoort | G06F 8/60 |
| 2023/0367479 A1* | 11/2023 | Colgrove | G06F 3/0608 |
| 2023/0370473 A1* | 11/2023 | Rungta | H04L 63/20 |

FOREIGN PATENT DOCUMENTS

| | | | | |
|---|---|---|---|---|
| CN | 109918427 A | * | 6/2019 | |
| CN | 110535835 A | * | 12/2019 | H04L 63/10 |
| CN | 112087490 A | * | 12/2020 | H04L 67/1095 |
| CN | 110287388 B | * | 7/2021 | |
| CN | 113273163 A | * | 8/2021 | H04L 67/06 |
| CN | 113810454 A | * | 12/2021 | |
| CN | 115329364 A | * | 11/2022 | |
| CN | 116506431 A | * | 7/2023 | |
| EP | 3812904 A1 | * | 4/2021 | G06F 3/0604 |
| JP | 2003069643 A | * | 3/2003 | |
| JP | 2020008985 A | * | 1/2020 | |
| JP | 2020036077 A | * | 3/2020 | |
| JP | 2022112290 A | * | 8/2022 | |
| KR | 20230122455 A | * | 8/2023 | |
| WO | WO-2015151186 A1 | * | 10/2015 | H04L 67/5651 |

\* cited by examiner

SYSTEMS AND METHODS FOR OPTIMIZING DATA FOR A SERVERLESS FILE SYSTEM

FIELD

The disclosed technology relates to systems and methods for optimizing data for a serverless file system. Specifically, this disclosed technology relates to systems and methods for optimizing and sharing common libraries as Lambda layers at the enterprise level.

BACKGROUND

Serverless architectures exist as a way for software developers to build and run applications and services without having to manage the associated infrastructure, which may instead be managed by a third party. One prevalent serverless architecture service is provided by Amazon Web Services (AWS), which provides a serverless, event-driven compute server for running code for a wide variety of applications known as AWS Lambda. AWS Lambda allows users to upload Lambda layers, which are archives that contain additional code, such as libraries, dependencies or custom routines, which can make it faster to deploy applications and reduce the overall size of the archive uploaded during a deployment.

Although Lambda layers provide significant benefits, they also have various drawbacks. For example, Lambda layers are conventionally created ad-hoc per deployment, leading to many duplications and lack of governance. Conventional approaches involve manual creation of Lambda layers, which is a very time-consuming process that requires specialized skills. Further, many applications cannot take advantage of the AWS server-less technology because AWS Lambda has strict size limitations that many applications may exceed.

Accordingly, there is a need for improved systems and methods for optimizing data for a serverless file system. Embodiments of the present disclosure are directed to this and other considerations.

SUMMARY

Disclosed embodiments may include a system for optimizing data for a serverless file system. The system may include one or more processors, and memory in communication with the one or more processors and storing instructions that, when executed by the one or more processors, are configured to cause the system to provide for the optimization of data for a serverless file system. The system may receive input data. The system may determine whether the input data is appropriate for optimization. Responsive to determining that the input data is appropriate for optimization, the system may optimize the input data to reduce a size to create optimized data, group the optimized data, apply metadata to the optimized data, wherein the metadata may be configured to accommodate an indication of all locations the optimized data is stored in a serverless file system, apply enterprise governance and compliance requirements to the optimized data, store the optimized data in a data repository, receive an input to upload the optimized data to the serverless file system, and determine, from the metadata, whether the optimized data is stored in the serverless file system. Responsive to determining that the optimized data is not stored in the serverless file system the system may upload, via an application programming interface, to the serverless file system, the optimized data, and update the metadata of the optimized data to indicate a new location at which the optimized data is stored on the serverless file system.

Disclosed embodiments may include a system for optimizing data for a serverless file system. The system may include one or more processors, and memory in communication with the one or more processors and storing instructions that, when executed by the one or more processors, are configured to cause the system to provide for the optimization of data for a serverless file system. The system may receive input data. The system may determine whether the input data is appropriate for optimization. Responsive to determining that the input data is appropriate for optimization the system may optimize the input data to reduce a size to create optimized data, group the optimized data, apply metadata to the optimized data, wherein the metadata may be configured to accommodate an indication of all locations the optimized data is stored in a serverless file system, apply enterprise governance and compliance requirements to the optimized data, store the optimized data in a data repository, generate a first graphical user interface including search input terms, transmit the first graphical user interface to a user device, receive a search command from the user device, generate, based on the search command and the metadata, an interactive search list, wherein the interactive search list shows results including the optimized data, generate a second graphical user interface including the interactive search list, transmit the second graphical user interface to the user device and receive a selection from the user device indicating to upload the optimized data.

Disclosed embodiments may include a system for optimizing data for a serverless file system. The system may include one or more processors, and memory in communication with the one or more processors and storing instructions that, when executed by the one or more processors, are configured to cause the system to provide for the optimization of data for a serverless file system. The system may receive input data. The system may optimize the input data to reduce a size to create optimized data. The system may group the optimized data. The system may apply metadata to the optimized data, wherein the metadata may be configured to accommodate an indication of all locations the optimized data is stored in a serverless file system. The system may apply enterprise governance and compliance requirements to the optimized data. The system may store the optimized data in a data repository. The system may generate a first graphical user interface including search input terms. The system may transmit the first graphical user interface to a user device. The system may receive a search command from the user device. The system may generate, based on the search command and the metadata, an interactive search list, wherein the interactive search list shows results including the optimized data. The system may generate a second graphical user interface including the interactive search list. The system may transmit the second graphical user interface to the user device. The system may receive an input from the user device to upload the optimized data to the serverless file system. The system may determine, from the metadata, whether the optimized data is stored in the serverless file system. Responsive to determining that the optimized data is not stored in the serverless file system the system may upload, via an application programming interface, to the serverless file system, the optimized data and update the metadata of the optimized data to indicate a new location at which the optimized data is stored on the serverless file system.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
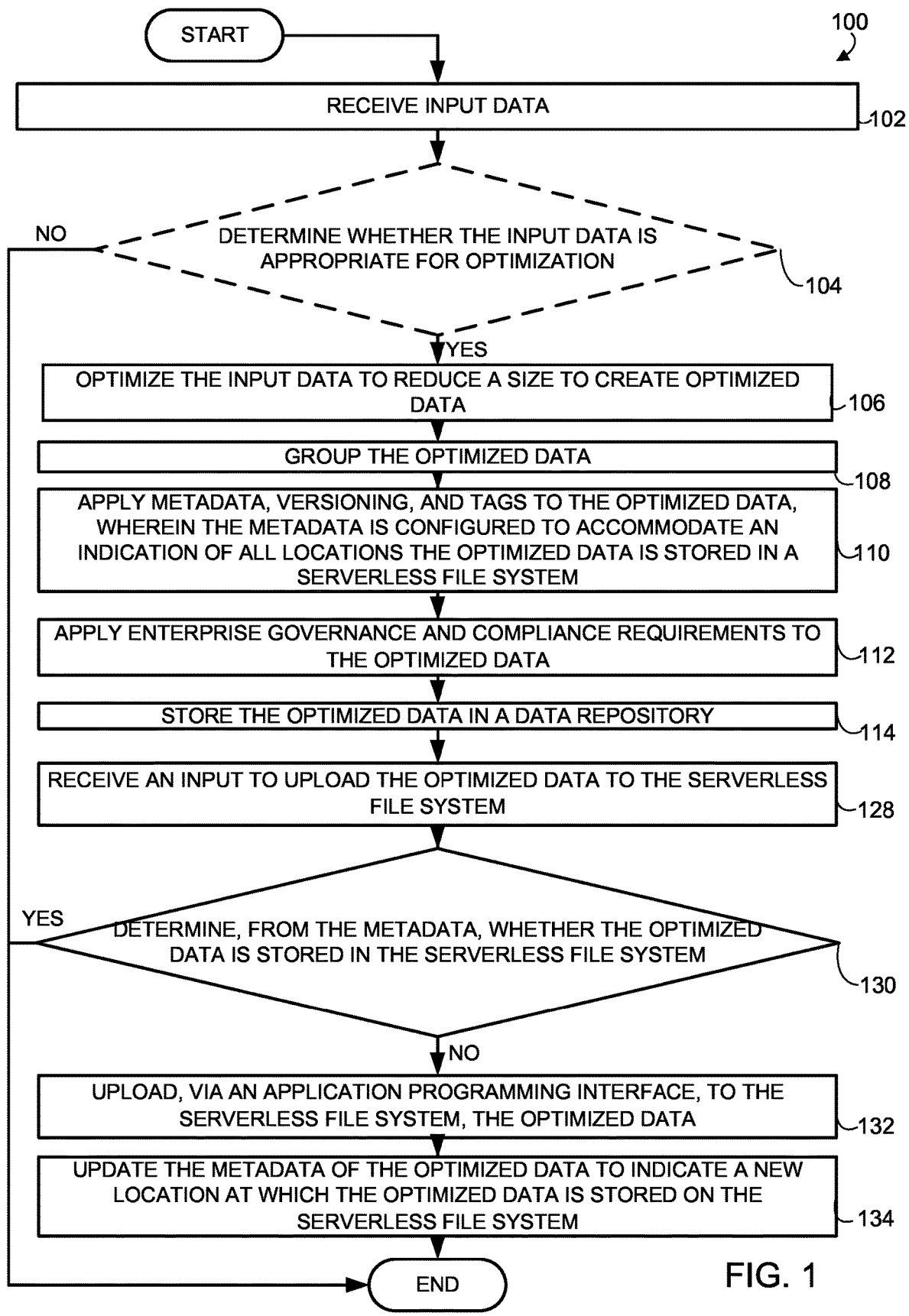
FIG. 1 is a flow diagram illustrating an exemplary method for optimizing data for a serverless file system in accordance with certain embodiments of the disclosed technology.

Examples of the present disclosure related to systems and methods for optimizing data for a serverless file system. More particularly, the disclosed technology relates to facilitating the uploading of a set of data/code to a serverless file system, that, in its original form, would have exceeded the serverless file system's maximum size restriction and thus would have originally been prevented from being uploaded to the serverless file system. The disclosed systems and methods may automatically reduce the size of the input data to create optimized input data that is capable of meeting the serverless file system's size restrictions and may thus be capable of being uploaded to the serverless file system. The disclosed system and methods may also provide aspects that improve the useability and management of data by, for example, adding features to the data, such as metadata, versioning, tags, enterprise governance and compliance requirements. By storing the optimized data in a data repository where it is in a condition to be uploaded to a serverless file system upon command, the system may provide for faster software deployment without the increased storage and financial cost of storing the data on the serverless file system prior to its intended use. The disclosed system may also provide a search functionality that may reduce redundant data storage and improve development speed by allowing users to search the data repository for optimized data sets to determine whether data sets that are desired to be created and/or uploaded to the serverless file system have already been created and/or uploaded.

The systems and methods described herein improve, in some instances, the operation of computers and technology. The present disclosure details generating optimized data, grouping the optimized data and storing the optimized data in a data repository in preparation for possible eventual upload to a serverless file system. Optimizing the input data to generate optimized data may reduce the size of the input data while maintaining the desired functionality of the input data, thereby reducing the amount of memory needed to store the input data and allowing the optimized data to be uploaded to a serverless file system that may have otherwise rejected upload of the input data based on a maximum data size restriction. Thus, the optimization performed by the system may both reduce data storage requirements and allow various data to be uploaded to a serverless file system that previously may have been prevented from doing so. Grouping the data within the optimized data may serve to make execution of a software deployment calling on the optimized data faster and more efficient by organizing the data such that inputs and outputs of the dependencies are located in a proximity to one another. Further, by utilizing a local data repository, the system may additionally save on costs associated with uploading data to a serverless file system by withholding the data on the local data repository until such time as uploading the data may become useful. However, by storing the optimized data in the data repository in configuration in which it is ready to be uploaded to the serverless file system (e.g., it meets the maximum data size), the system can increase the speed at which data can be uploaded for deployment. Furthermore, as discussed below, embodiments of the present disclosure may utilize graphical user interfaces and/or machine learning models, which are necessarily rooted in computers and technology, to facilitate the creation of optimized data. Thus, the present disclosure is both rooted in computers and technology and may provide various technical advantages and benefits.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for optimizing data for a serverless file system, in accordance with certain embodiments of the disclosed technology. The steps of method 100 may be performed by one or more components of the system 400 (e.g., optimization and storage system 320 or web server 410 of data system 408, serverless file system 450 or user device 402), as described in more detail with respect to FIGS. 3 and 4.

In block 102, the optimization and storage system 320 may receive input data. According to some embodiments, the input data may be software code that may represent one or more computer programs of or portions or a computer program. In some embodiments, the input data may include software libraries, dependencies and/or custom runtimes. Software libraries may include a collection of programs and/or software packages. As will be appreciated by those of skill in the art, a software dependency may be a code library or package that is reused in another piece of software, such that the other piece of software relies on or depends on it for its proper operation. For example, a particular machine learning model may call a Python library to build models, and thus the particular machine learning model is dependent on the Python library. Custom runtimes may allow users to define new runtime environments, which may include additional components such as language interpreters or application servers.

According to some embodiments, the optimization and storage system 320 may receive input in response to a user selecting the input data to be sent to the optimization and storage system 320. For example, in some embodiments, the input data may be stored on a user device 402, which may also be running a software application that is configured to allow the user to select one or more sets of input data to submit to the optimization and storage system 320 to be processed as described herein. In some embodiments, the input data may be stored on another device, such as for example, web server 410, optimization and storage system 320 or database 416, and a software application running on the user device 402 may be configured to allow the user to select the input data that is stored on another device and transmit it to and/or load it on optimization and storage system 320 for processing.

In block 104, the optimization and storage system 320 may optionally determine whether the input data is appropriate for optimization. According to some embodiments, determining whether the input data is appropriate for optimization may include comparing the size of the input data to a minimum size threshold and/or a maximum size threshold. In some embodiments, if the size of the input data is less than the minimum size threshold (e.g., less than 50 megabytes) or greater than the maximum size threshold (e.g., greater than 250 megabytes), then the optimization and storage system 320 may determine that the input data is of too small or two large of a size to benefit from the remaining optimization processing and thus method 100 may end. According to some embodiments, if the input data is above the maximum size threshold then it may be too large to benefit from the optimization process because it may be expected that following the optimization process the optimized input data may still be larger than the serverless file system 450's (e.g., AWS Lambda Service) size limitation for data chunks (e.g., Lambda layers) and thus would not be allowed to be uploaded to the serverless file system 450. Conversely, if the input data is already of sufficiently small enough size, it may already be below the serverless file system 450 size limitation and may thus may already be capable of being uploaded to the serverless file system 450. In some embodiments, even if the input data is below the minimum size threshold, the input data may nonetheless proceed to block 106 to process the input data in accordance with the remainder of method 100 to further reduce the size of the input data. According to some embodiments, if the size of the input data is greater than the minimum size threshold and smaller than the maximum size threshold, then the optimization and storage system 320 may determine that the input data is of an appropriate size to be optimized as described in block 106 below. According to some embodiments, the minimum size threshold may be 50 megabytes and the maximum size threshold may be 250 megabytes, however it will be understood that these are merely examples and these thresholds may be set to different sizes, as may be appropriate based on the size limitations for uploading chunks of data (e.g., Lambda layers) of the serverless architecture service (e.g., serverless file system 450).

According to some embodiments, the maximum size threshold may not represent the serverless file system 450's size limitation for uploading chunks of data but may rather represent a maximum data size of input data at which it is expected that performing the data optimization performed herein will result in optimized data having a small enough size to be under the serverless file system's 450's size limitation. For example, if the size restriction of the serverless file system 450 is 200 megabytes and the optimization process described herein is expected to reduce the size of the input data by at least 80%, then the maximum size threshold may be set to be 1 gigabyte. In this example, if input data has a size of 1 gigabyte or less and the optimization and storage system 320 will generated optimized data that is at least 80% smaller, then the optimized data will have a size that is equal to or less than the 200 megabyte size limitation of the serverless file system 450 and will thus be capable of being uploaded to the serverless file system 450. However, in this example, if the input data has a size that is greater than the 1 gigabyte maximum size threshold, then the size of the optimized data following the optimization process performed by the optimization and storage system 320 may be larger than the 200 megabyte size limitation and thus may be restricted by the serverless file system 450 from being uploaded. According to some embodiments, the optimization process performed by the optimization and storage system 320 may be expected to generate optimized data that is at least 80% smaller than the size of the input data. In some embodiments, the serverless file system 450 may have a size limitation of 250 megabytes on uploads of chunks (e.g., Lambda layers or other groupings of data/code) of data. Thus, in some embodiments, a maximum size threshold of the input data may be 1.25 gigabytes, as an at least 80% reduction of 1.25 gigabytes will result in an optimized data chunk of 250 megabytes or less, which may be equal to or less than the upload size limitation of the serverless file system 450. The data upload limit sizes and threshold sizes provided herein are merely exemplary, and it should be understood that different serverless file systems 450 may have differently sized restrictions on data uploads. Thus, it will be understood that in various embodiments, the maximum size threshold utilized by the optimization and storage system 320 may be set to different numbers based on differences in the data upload size limitation of the serverless file system 450 and on an expected percent reduction in the input data following the optimization process performed by the optimization and storage system 320.

According to some embodiments, determining whether the input data is appropriate for optimization may include identifying whether one or more dependencies exist and in response to identifying that the one or more dependencies exist, determining whether a sum of a total size of the one or more dependencies is greater than 50 megabytes and less than 250 megabytes and in response to determining that the sum of the total size of the one or more dependencies is greater than 50 megabytes and less than 250 megabytes, determining that the input data is appropriate for the system.

According to some embodiments, determining whether the input data is appropriate for optimization may include determining whether the software packages are reusable. All reusable software packages and/or libraries (regardless of size) may be optionally optimized using the disclosed system. Reusable software may be software used as a dependency for many other software solutions. Small software packages may be optionally optimized even if below the minimum size threshold as described in the paragraphs above.

In block 106, the optimization and storage system 320 may optimize the input data to reduce a size to create optimized data. According to some embodiments, the size of the totality of the input data may be reduced by the optimization and storage system 320, by for example, reducing the size of one, many or all files of the input data. By way of example, if the original size of a set of input data is 1 gigabyte, then following the optimization of the input data by the optimization and storage system 320, the size of the resultant optimized data may be, for example, 200 megabytes. Size reduction may include deleting duplicate files, deleting files deemed to be unnecessary, deleting specific types of files, deleting portions of files, truncating portions of files, and compressing files (e.g., minification). The optimization performed by optimization and storage system 320 may serve to reduce the size of the input data while being designed to retain all important information in the input data. In other words, according to some embodiments, the optimized data can be used to perform substantially the same functionality as the unoptimized input data. However, due to size restrictions that may be imposed by a serverless file system 450, unoptimized input may be too large to upload to a serverless file system 450, and therefore the optimization performed by the optimization and storage system 320 on the input data may allow for chunks of data/code to be uploaded to and deployed from the serverless file system 450 that otherwise would have been too large to do so.

According to some embodiments, optimizing the input data may include determining a programming language of the input data and in response to determining the programming language of the input data, completing language-specific size optimizations of the input data, stripping object and/or debug symbols from shared library files (e.g., .so files), deleting test folders and compressing the input data.

As will be appreciated by those of skill in the art, software programs can be written in many different languages, such as for example, JavaScript, Python, Java, C/C++, PHP, Swift, C#, Objective-C, SQL, Ruby, and many others. Each language may include different types of files and/or different structuring of files. Thus, optimization techniques applied by optimization and storage system 320 to the input data may be dependent on the underlying languages used to generate the various files that make up the input data. In other words, in some embodiments, the optimization and storage system 320 may apply language-specific size optimizations to the input data. According to some embodiments, language-specific size optimizations may include, for example, deleting compiler and/or object files (e.g., in Python), minifying files in JavaScript and CSS, stripping object tables for binary files (e.g., .SO and .DLL files), removing test folders, removing unused language files (e.g., Chinese, Japanese, etc.), or combinations thereof. In some embodiments, the serverless file system 450 may automatically generate compiler and/or object files for the input data after being uploaded to the serverless file system 450 for certain types of files (e.g., files written in Python), and thus the compiler and/or object files may be deleted prior to upload without losing any desired functionality of the input data. According to some embodiments, minification may be applied to files written in JavaScript to reduce source code size by, for example, removing unnecessary characters, comment blocks, and shortening local variables and function names. According to some embodiments, the optimization and storage system 320 may utilize an open-source or closed-source JavaScript minification tool (e.g., Minify JS) to perform the minification of one or more files written in JavaScript or other minification tools for similar functionality for one or more files written in the Cascading Style Sheets (CSS) language.

Shared library files such as .so files may include one or more symbol tables that store, for example, object and/or debug symbols. According to some embodiments, optimization and storage system 320 may identify that a file within the input data is a shared library file by, for example, determining that the extension of the file is ".so", and then may automatically delete object and/or debug symbols and data associated with the object/debug symbols from one, many or all symbol tables contained within the shared library file (e.g., using open-source software, such as GNU Strip). As these symbols and their associated information may generally be used for debugging purposes, it may not be necessary to retain this data in a version of the software code/data that is deployed in order to substantially retain the desired functionality of the deployed code/data.

Test folders may be folders that store bits of software code, data, files and other information that may be used to run tests on software/data for quality assurance purposes, which may include for example, documents and code relating to unit tests, integration tests, functional tests, and mock objects. Such test folders may be used during software development to test new additions to a software program to make sure such new additions do not negatively affect the functionality of any of the previously developed software code. According to some embodiments, the optimization and storage system 320 can identify test folders within the input data and delete the folders, their contents and any associated outputs of the tests (e.g., other files or folders that are generated at test outputs but that are not stored within the test folders themselves). The identification process may be completed using a pattern recognition machine learning model. The pattern recognition model may be trained using labeled training data. The system may search for folders containing files with certain names (e.g., "test," "e2e," etc.). Once the system locates the folder, the system may examine the contents of the folder for test packages (e.g., using Junit for Java and Maven or Unittest for Python).

In some embodiments, the input data may be made up of a plurality of files of different file types (e.g., as indicated by the extension of the file) and/or files that were written in different programming languages. According to some embodiments, the optimization and storage system 320 may apply different size reduction techniques to each file within the plurality of files of the input data based on the characteristics (e.g., file type, language (e.g., JavaScript), size, etc.) of the file. In other words, different size reduction techniques (or combinations of reduction techniques) may be applied by the optimization and storage system 320 to different files within the input data. Thus, on a given set of input data, the optimization and storage system 320 may perform one, some or all of the size reduction/optimization techniques described herein. According to some embodiments, the size of the input data may be reduced by at least 80% following the optimization performed by the optimization and storage system 320. In some embodiments, the input data may be reduced by approximately between 50% to 80% following the optimization process performed by the optimization and storage system 320.

According to some embodiments, optimizing the input data may be completed by a first machine learning model. The first machine learning model may be trained to complete language-specific optimization of the input data based on prior examples of the input data and the optimized data. For example, the first machine learning model may be trained using a training data set that is made up of unoptimized data inputs and corresponding data outputs that are either optimized data or not along with an indication of whether the output was properly optimized (e.g., either a binary indication of acceptable/unacceptable optimization or a score on a scale (e.g., scale of 1 to 10) that indicates how well optimized the output data is) to learn how to take an unoptimized data input and generate a corresponding optimized data output. According to some embodiments, the optimization and storage system 320 may utilize a plurality of different machine learning models, in which each machine learning model is intended to be used on files that are written in a particular language and are trained using training files that are written in that language. For example, one machine learning model may be trained using documents that were written in JavaScript and may be used on files of the input data that are written in JavaScript to optimize those files, while another machine learning model may be trained to optimize files that were written in Python, etc. According to some embodiments, whether by applying a set of rules to the input data and/or applying one or more machine learning models to the data, the optimization and storage system 320 may perform the optimization of the input data automatically (e.g., in response to determining that the data is appropriate for optimization or in response to a user input).

According to some embodiments, the optimization and storage system 320 may train and use a machine learning model to identify portions of the input data that are unnecessary to perform certain desired tasks or functionalities and based on the output of such a machine learning model the optimization and storage system 320 may automatically remove such identified portions from the input data. As described above, pattern recognition machine learning models may be used to aid in the identification of portions of input data that are unnecessary. The same models may also be used to delete the identified portions of the input data. The machine learning models may be used to detect test folders within a package, detect a version of a package, detect the type of programming language, detect if there is a transaction language of the package, as well as other assorted features about the package. The system may use a conditional random field (CRF) machine learning model for identification of features.

In block 108, the optimization and storage system 320 may group the optimized data. According to some embodiments, grouping the optimized data may include locating dependencies in the optimized data and grouping, using heuristics, the optimized data such that inputs and outputs of the dependencies are located in a proximity to one another (e.g., if package B depends on package A, then package B is grouped with package A). Grouping the optimized data may also be completed by common usage (e.g., packages that are always or commonly used together are placed together). Furthermore, dependencies in the optimized data may be grouped by tags, which may be added by the system after locating dependencies. For example, a "depends on" tag may list package names used by the current package. A "used by" tag may list other packages that use the current package. Dependency information may be located by application programming interfaces (APIs), which return software lineage information. Grouping the optimized data such that inputs and outputs of the dependencies are located in a proximity to one another may provide a benefit of reducing processing time and allowing the code to execute more quickly. Tightly used packages may specifically benefit from being stored in a common location (e.g., the same Lambda layer).

According to some embodiments, grouping the optimized data may be completed by a second machine learning model based on prior examples of the input data and the optimized data. For example, the second machine learning model may be trained to group the optimized data using a training data set of prior examples of input data and output data, such as for example, prior sets of ungrouped data and corresponding sets of grouped data, along with some metric of how well the data is grouped (e.g., a binary metric of acceptable or unacceptable grouping or a metric on a scale (e.g., a scale of 1 to 10) of how successfully/usefully grouped the data is) to learn how to take ungrouped input data and reorganize it into groupings. Grouping the optimized data may be completed using clustering algorithms, such as a k-means clustering algorithm. Inputs to the clustering algorithm or model may include a list of tags, package name, package version, language, dependencies, and usage data. Outputs may include the cluster of groupings of package names. As described previously, grouping the data effectively (e.g., such that inputs and outputs of dependencies are located near each other) can provide technical benefits such as increased execution speed during the deployment of the data. According to some embodiments, the optimization and storage system 320 may automatically group the data, whether by use of a machine learning model, use of heuristics as described above or whether by some other manner that may be known in the art.

In block 110, the optimization and storage system 320 may apply metadata, versioning, and tags to the optimized data. According to some embodiments, the metadata may be configured to accommodate an indication of all locations the optimized data is stored in one or more serverless file systems 450. In other words, according to some embodiments, the metadata that is applied to the optimized data may include a data structure, such as one or more fields, that can store data indicative of one or more locations at which the optimized data is stored on one or more serverless file systems 450. According to some embodiments, this data structure may initially be empty as the optimized data will not yet have been stored on the serverless file system 450 immediately following optimization, however the existence of this data structure may allow for storage location data to be added to the field in the future. Although the application of the metadata to the optimized data is described with respect to block 110, it is contemplated that this may alternatively be performed at another step, such as at block 112, block 114 or any other suitable time in the process.

Such metadata, versioning and tags can allow a user to easily search to see if a desired set of optimized data has already been stored in the serverless file system 450. According to some embodiments, the metadata may include a data structure configured to store zero or more known locations within one or more serverless file systems 450 at which the optimized data is stored. Furthermore, metadata may include, for example: source or author, Github repository, current major and minor version, programming language, last update date, build date, usage count, known vulnerabilities, end-of-life date, license date, and other software data traits. In some embodiments, versioning may indicate what version a particular set of optimized data is. For example, if a first set of optimized data is based on a set of libraries and dependencies and the set of libraries and dependencies is later modified in some way, then a second set of optimized data may be created based on the modified set of libraries and dependencies and that the optimization and storage system 320 may label the first and second sets of optimized data as being a first and second version, respectfully, of the same underlying set of input data. Such versioning can help users quickly find previous versions of the same optimized data if desired. According to some embodiments, tags may be applied to the optimized data to help users search for Lambda layers relating to desired functionalities. Thus, tags may describe one or more functionalities, uses, or characteristics of a given set of optimized data. Examples of tags may include, but are not limited to, for example used by, depends on, category, subcategory, language, version, or license. According to some embodiments, some of the metadata, versioning and/or tags may be input by a user in response to a prompt provided by the optimization and storage system 320. According to some embodiments, some of the metadata, versioning and/or tags may be automatically applied to the optimized data by the optimization and storage system 320 by in block 108 when the optimized data is grouped, and tags may be used to aid grouping the optimized data in block 108. As described above, version information may be extracted from the package name or using a pattern recognition machine learning model or from software lineage API. Additionally, some tags may be added manually when the data is received or inputted into the system.

In block 112, the optimization and storage system 320 may apply enterprise governance and compliance requirements to the optimized data. According to some embodiments, enterprise governance and compliance requirements may include applying password protection or other security features, licensing information and validations, governance for access controls and allowed usage, policies for the deployment environment, vulnerability tracking, license validations, and end-of-life tracking by version and date. In some embodiments, enterprise and governance requirements may be applied to the optimized data manually by a user in response to a prompt from the optimization and storage system 320. In some embodiments, enterprise and governance requirements may be applied to the optimized data automatically by the optimization and storage system 320 by using automated governance tools that read the package metadata, and apply the appropriate governance action based on the metadata. This may be accomplished as a batch process that scans the entirety of packages on a schedule and revises and completes governance requirements.

According to some embodiments, applying the enterprise governance and the compliance requirements may include verifying security requirements and license needs for the optimized data. For example, a license to use a particular piece of software that may be incorporated into the input data may be specific to a particular user, organization or division of an organization. Similarly, a license may specify who may access certain data and/or where the data may be stored. If optimization and storage system 320 identifies that the software package has a bug and/or vulnerability, the system may be able to take action, such as by tagging the package with warning information or disabling its usage. Similarly, if optimization and storage system 320 identifies that the software package is improperly licensed, it may remove the software package or tag the package with a warning of licensing issues.

In block 114, the optimization and storage system 320 may store the optimized data in a data repository. According to some embodiments, the data repository may be an optimization and storage system database 360 that is part of the optimization and storage system 320, a database 416 or in some other data storage device or location that is accessible by the optimization and storage system 320. According to some embodiments, the data repository may store a plurality of chunks of optimized data, wherein each chunk is a set of input data that has gone through the steps of method 100 up to this point. In some embodiments, each chunk of optimized data may be stored in an object storage file system (e.g., S3) in a compressed format. In some embodiments, each stored chunk of optimized data will be stored in association with any metadata, versioning and/or tags that were applied by the optimization and storage system 320 at block 110, which may allow a user to perform searches of the data repository (e.g., via a software application running on a user device 402 that is configured to interface with the optimization and storage system 320) to locate a desired chunk of optimized data. For example, the data stored in the data repository may be stored in a manner that allows for a user to search for particular chunks of optimized data based on the metadata, versioning and/or tags associated with the respective chunks of metadata. As will be described below, chunks of optimized data may be uploaded to one or more serverless file systems 450 from the data repository, for example, in response to a user selection of a chunk of optimized data and a user input (e.g., entered via a user device 402) indicating an instruction to upload the chunk of optimized data to a serverless file system 450.

According to some embodiments, the optimized data may be stored in the data repository for any amount of time before a request is received to upload it to the serverless file system 450. For example, a user might request that the optimized data be uploaded to the serverless file system 450 for immediate use right after creating and storing the optimized data in the data repository, or the user may plan to upload and use the optimized data at a much later date and simply want to get it ready to be uploaded. As will be appreciated, uploading and storing data on a serverless file system 450 may be quite expensive, and therefore the use of the data system 400 to optimize and store data in the data repository may provide a much cheaper storage option while also allowing for the data to be placed in a condition where it can be ready to be quickly uploaded and deployed if and when necessary. As such, the data system 400 can increase the readiness and speed with which an organization can deploy a piece of software, without the undue financial burden of uploading everything to the serverless file system 450 at all times.

In block 128, the optimization and storage system 320 may receive an input to upload the optimized data to the serverless file system 450. For example, a user may input a command (e.g., via user device 402) to upload a selected chunk of optimized data to the serverless file system 450. In response to receiving such an input, the optimization and storage system 320 may cause the selected chunk to be uploaded to one or more selected serverless file systems 450. According to some embodiments, the optimization and storage system 320 may update metadata associated with the uploaded chunk of optimized data to indicate one or more locations on the one or more serverless file systems 450 that the chunk of optimized data was uploaded to. Thus, when future users search the data repository for the optimized data chunk, the user will be able to see that the optimized data chunk has already been uploaded to one or more serverless file systems 450 and will be able to see the locations to which the optimized data chunk has been uploaded.

In block 130, the optimization and storage system 320 may determine, from the metadata, whether the optimized data is stored in the serverless file system 450. According to some embodiments, the optimization and storage system 320 may determine that the optimized data is not stored in the serverless file system 450 if the metadata does not include data indicating a storage location of the optimized data in the serverless file system 450. Conversely, if the metadata does include data indicative of one or more storage locations on serverless file system 450, then the optimization and storage system 320 may determine that the optimized data is stored in the serverless file system 450.

If the optimization and storage system 320 determines that the optimized data is already stored in the serverless file system 450, then the optimization and storage system 320 may end the method 100. Thus, the optimization and storage system 320 may provide a benefit of preventing duplicate data from being uploaded and stored to a serverless file system 450, which can both reduce the amount of storage required and reduce the cost of utilizing such a serverless file system 450. If the optimization and storage system 320 determines that the optimized data is not stored in the serverless file system 405, then the method 100 may proceed to block 132 to upload the optimized data to the serverless file system 450.

According to some embodiments, the optimization and storage system 320 may decompress the optimized data in response to determining that the optimized data is not stored in the serverless file system 450. In some embodiments, the optimized data may be uploaded to the serverless file system in a zip (compressed) format. The serverless file system may expand and install the optimized data from the zip (compressed) format. Additionally, for storage off the serverless file system, the optimization and storage system 320 may keep the optimized data in a compressed (zip) format.

According to some embodiments, the optimization and storage system 320 may reference the optimized data in the serverless file system 450 in response to determining that the optimized data is stored in the serverless file system 450. In other words, if a user searches to see if the optimized data is already stored in the serverless file system 450 or not and the optimization and storage system 320 determines (e.g., based on the metadata associated with the optimized data stored in the data repository) that the optimized data is already stored in the serverless file system 450 then the optimization and storage system 320 may provide the user with a reference, such as a web link, address, pointer or other indication of the location of the already stored optimized data so that the user can access it. For example, the optimization and storage system 320 may present, via a graphical user interface displayed on the user device 402, a web link that when clicked may allow the user to access, copy, deploy or otherwise utilize the stored optimized data in a desired manner.

In block 132, the optimization and storage system 320 may upload the optimized data to the serverless file system 450 via an application programming interface (API). In some embodiments, the API may allow the optimization and storage system 320 to upload the optimized data to a serverless file system 450 in a manner in which the optimized data will be associated with the account of the user/organization such that the user and/or other members of the organization have access to and the ability to deploy the uploaded optimized data.

In block 134, the optimization and storage system 320 may update the metadata of the optimized data to indicate a new location at which the optimized data is stored on the serverless file system 450. According to some embodiments, the serverless file system 450 may include multiple different servers and/or locations that the optimized data is uploaded to, in which case the optimization and storage system 320 may update the metadata of the optimized data stored in the data repository to reflect all locations within the serverless file system 450 at which the optimized data is stored. For example, some serverless file systems 450 may include mirrored servers and/or servers located in different time zones and in some cases it may be desirable to store the optimized data in multiple locations of the serverless file system 450 so that, for example, it can be deployed locally faster if necessary.

Figure 2:
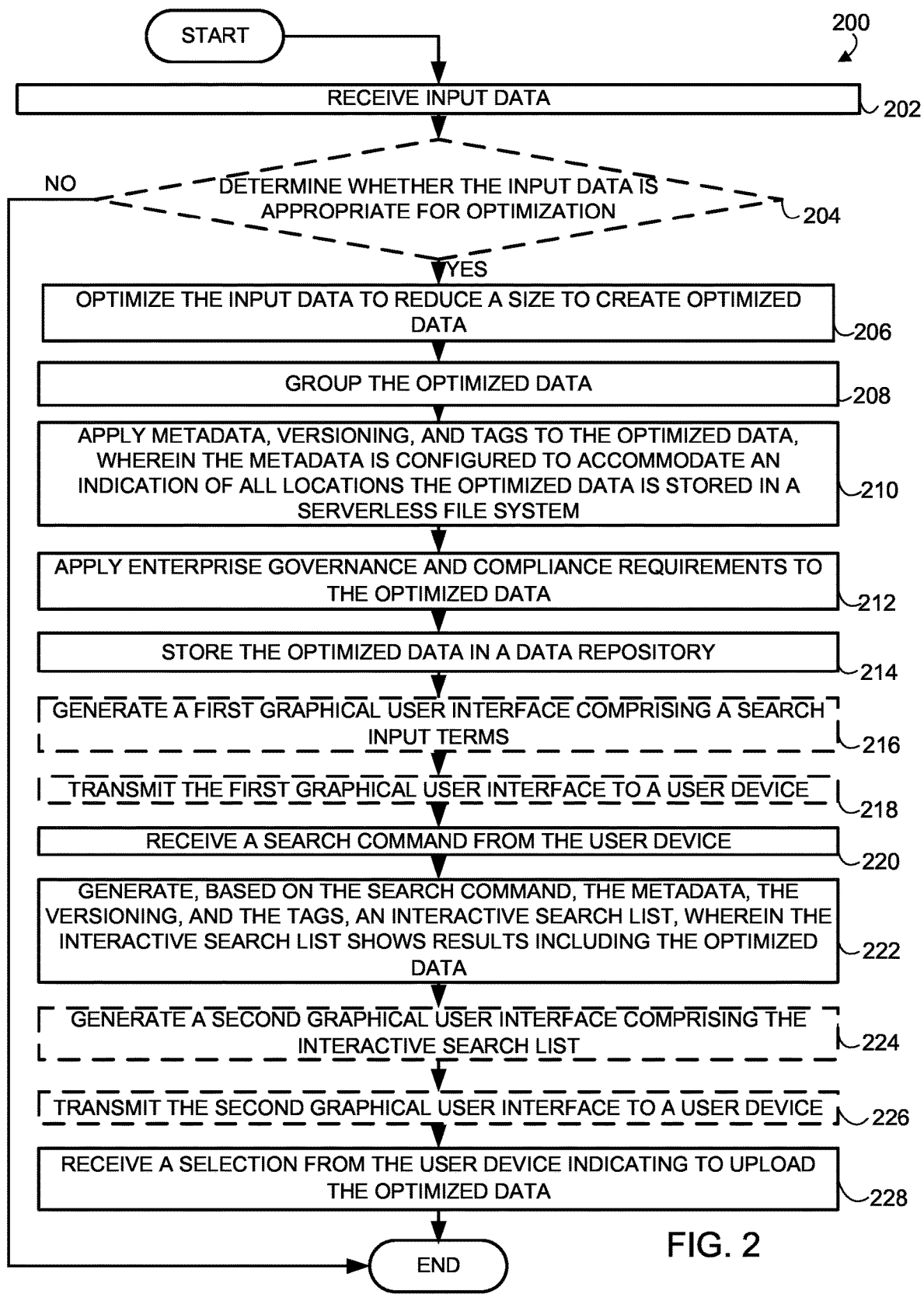
FIG. 2 is a flow diagram illustrating an exemplary method for optimizing data for a serverless file system in accordance with certain embodiments of the disclosed technology.

FIG. 2 is a flow diagram illustrating an exemplary method 200 for optimizing data for a serverless file system 450, in accordance with certain embodiments of the disclosed technology. The steps of method 200 may be performed by one or more components of the system 400 (e.g., optimization and storage system 320, web server 410 of data system 408, serverless file system 450 or user device 402), as described in more detail with respect to FIGS. 3 and 4.

Method 200 of FIG. 2 is similar to method 100 of FIG. 1, except that method 200 may not include blocks 128, 130, 132 or 134 of method 100. The descriptions of blocks 202, 204, 206, 208, 210, 212, and 214 in method 200 are similar to the respective descriptions of blocks 102, 104, 106, 108, 110, 112, and 114 of method 100 and are not repeated herein for brevity. Additional blocks 216, 218, 220, 222, 224, 226 and 228 are also described below.

In block 206, the optimization and storage system 320 may optimize the input data to reduce a size to create optimized data in a manner similar to that described above with respect to block 106. Further, according to some embodiments, optimizing the input data may be completed by a first machine learning model. In some embodiments, the first machine learning model may complete language-specific optimizations of the input data to create optimized data based on prior examples of the input data and the optimized data. The system may use machine learning to extract information from the input data before optimization in order to ensure the correct optimization is performed. As described above, the system may also use machine learning to identify and delete test folders. Machine learning models may be trained with a labeled list of package names with versions, folders, and files.

In block 216, the optimization and storage system 320 may optionally generate a first graphical user interface including search input terms. According to some embodiments, the search input terms may include selectable items, such as a list of tags or characteristics that a user may select from. The characteristics may include aspects of data relating to enterprise governance and/or compliance requirements, such as for example, an indication of what users or groups of users have authorization to access/use a particular set of data, licensing requirements of the data, what programming language(s) the data includes, and other such characteristics of the data. In some embodiments, the search input terms may be prepopulated with selectable options (e.g., a prepopulated list of tags) or may provide search fields for a user to input search terms (e.g., a field for inputting search terms to search tags). In some embodiments, the search input terms may include any aspect of metadata, versioning, or tags associated with optimized data chunks stored in the data repository. The search input terms may include other searchable aspects, such as for example, keywords, how long the data has been stored in the repository or when it was originally uploaded, whether and when the data has been uploaded to the serverless file system 450, whether and when the data has been deployed, what users have uploaded or otherwise interacted with the data, or other such aspects relating to historical storage and usage of data.

In block 218, the optimization and storage system 320 may optionally transmit the first graphical user interface to a user device. According to some embodiments, the user device 402 may include a software application that is configured to display graphical user interfaces or other data received from the optimization and storage system 320, receive user inputs via the user device 402 and transmit data representative of the user inputs to the optimization and storage system 320. Thus, the user device 402 may display the first graphical user interface on a display screen of the user device 402, which may display the search input terms and allow the user to select and/or input their own search terms.

In block 220, the optimization and storage system 320 may receive a search command from the user device. For example, the user may input a number of search terms into a "Search Tags" field of the search input terms displayed by the user device 402 and upon submitting the entered search terms the user device 402 may transmit data representative of the entered search terms to the optimization and storage system 320.

In block 222, the optimization and storage system 320 may generate an interactive search list that may show results including the optimized data based on the search command. According to some embodiments, generating the interactive search list may be based on the metadata, the versioning, and/or the tags. For example, if the search command includes a search term of "API" entered into a "Search Tags" field, then the optimization and storage system 320 may return an interactive search list of results that may be a list of one or more chunks of optimized data that are stored in the data repository that are associated with the tag "API," thereby allowing the user to search for and locate all optimized data relating to APIs. According to some embodiments, the results may be entries that may include information regarding the entry, an architecture, a last updated date, contributors, or combinations thereof, thereby allowing the user to quickly view information about each chunk of optimized data that was returned as a result that may be potentially relevant to the user in searching for a desired chunk of optimized data. In some embodiments, the interactive search list may display the results in an interactive fashion that may allow the user to navigate through the results (e.g., scrolling the list up or down), perform further searches on the interactive search list (e.g., applying another search criteria to the search list to further reduce the results) and/or interact with a selected result (e.g., allowing the user to select a chunk of optimized data from the list and cause it to be uploaded to the serverless file system 450). According to some embodiments, the interactive search list may include filters used to sort results and access control limitations that require user authentication to view certain results. Search results may provide the ability to filter options by different criteria, such as version or date.

In block 224, the optimization and storage system 320 may generate a second graphical user interface comprising the interactive search list. For example, the optimization and storage system 320 may generate computer code that provides instructions for the display and functionality of the second graphical user interface that includes the interactive search list and functionalities relating to the interactive search list such as navigational functions, functions that allow a user to filter the interactive search list, and functions that allow a user to select one or more results of the interactive search list for upload to the serverless file system 450. The second graphical user interface may present a revision of the order of the interactive search list according to search criteria changes received from the user device.

In block 226, the optimization and storage system 320 may optionally transmit the second graphical user interface to the user device. For example, the optimization and storage system 320 may transmit computer code for rendering the second graphical user interface to a user device 402 so that the user device 402 can render the graphical user interface on a display of the user device 402.

In block 228, the optimization and storage system 320 may optionally receive a selection from the user device indicating to upload the optimized data. For example, the second graphical user interface may be displayed by a user device 402, which may allow a user to interact with and select one or more optimized data chunks for upload to the serverless file system 450. Upon inputting and submitting a selection of an optimized data chunk, the user device 402 may transmit data representative of the selected optimized data chunk to the optimization and storage system 320 for processing. According to some embodiments, in response to receiving the data representative of the selected optimized data chunk from the user device 402, the optimization and storage system 320 may upload the optimized data via an application programming interface to the serverless file system 450 in a manner similar to that described above with respect to block 132.

According to some embodiments of method 200, the optimization and storage system 320 may optionally determine whether the optimize data is stored in the serverless file system 450 and either upload the optimized data to the serverless file system 450 and update its metadata in response to determining it is not or provide a reference to the optimized data in the serverless file system 450 in a manner similar to that described above with respect to blocks 130, 132 and 134.

According to some embodiments, the optimization and storage system 320 may, in response to determining that the optimized data is not stored in the serverless file system 450, generate a third graphical user interface that may indicate that the optimized data has been uploaded to the serverless file system 450 and may also optionally indicate the new location at which the optimized data is stored and transmit the third graphical user interface to the user device 402. According to some embodiments, the optimization and storage system 320 may, in response to determining that the optimized data is stored in the serverless file system 450, reference the optimized data in the serverless file system 450, generate a fourth graphical user interface indicating that the optimized data was already uploaded to the serverless file system 450 and may optionally indicate that the optimized data was referenced instead of reuploaded and transmit the fourth graphical user interface to the user device 402. In other words, in some embodiments, in response to a user submitting a selection of a chunk of optimized data to be uploaded to the serverless file system 450, the optimization and storage system 320 may first determine whether the selected chunk of optimized data has already been uploaded or not (e.g., as described in block 130) and then based on the result of that determination, either uploads the selected chunk of optimized data to the serverless file system 450 and provides a third graphical user interface to the user device 402 of the user that serves to inform that user that the selected optimized data has been uploaded to the serverless file system 450 and at what location it has been stored, or, provides the a fourth graphical user interface to the user device 402 that serves to inform the user that the selected optimized data has previously already been uploaded to the serverless file system 450. According to some embodiments, the fourth graphical user interface may provide a reference, such as a web link or an indication of a storage location, to the user that provides the user with the ability to access, locate or otherwise reference the already stored version of the selected optimized data.

Figure 3:
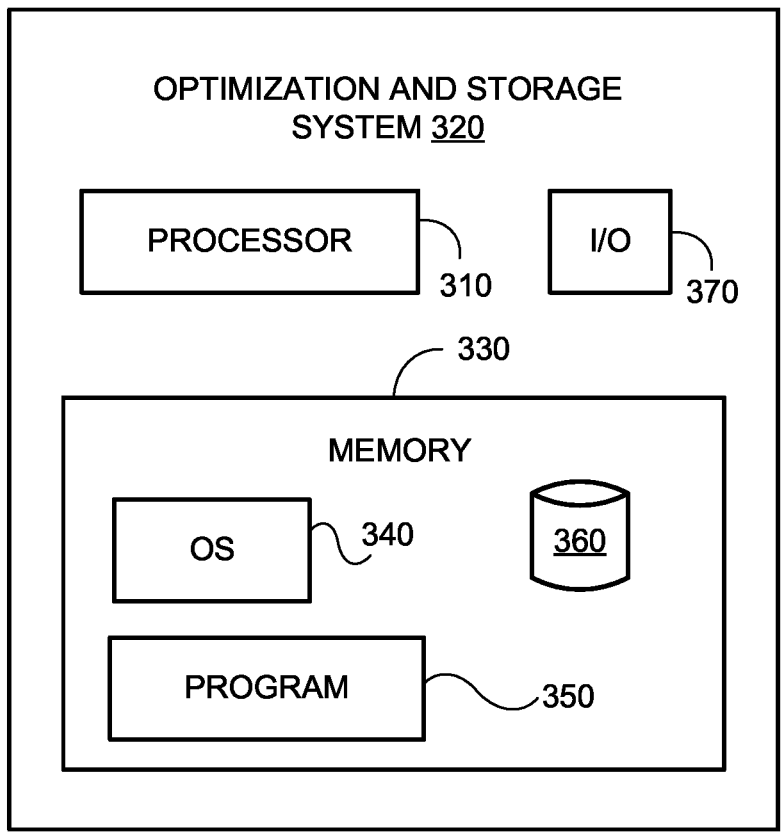
FIG. 3 is a block diagram of an example optimization and storage system used to provide optimizing data for a serverless file system, according to an example implementation of the disclosed technology.
Figure 4:
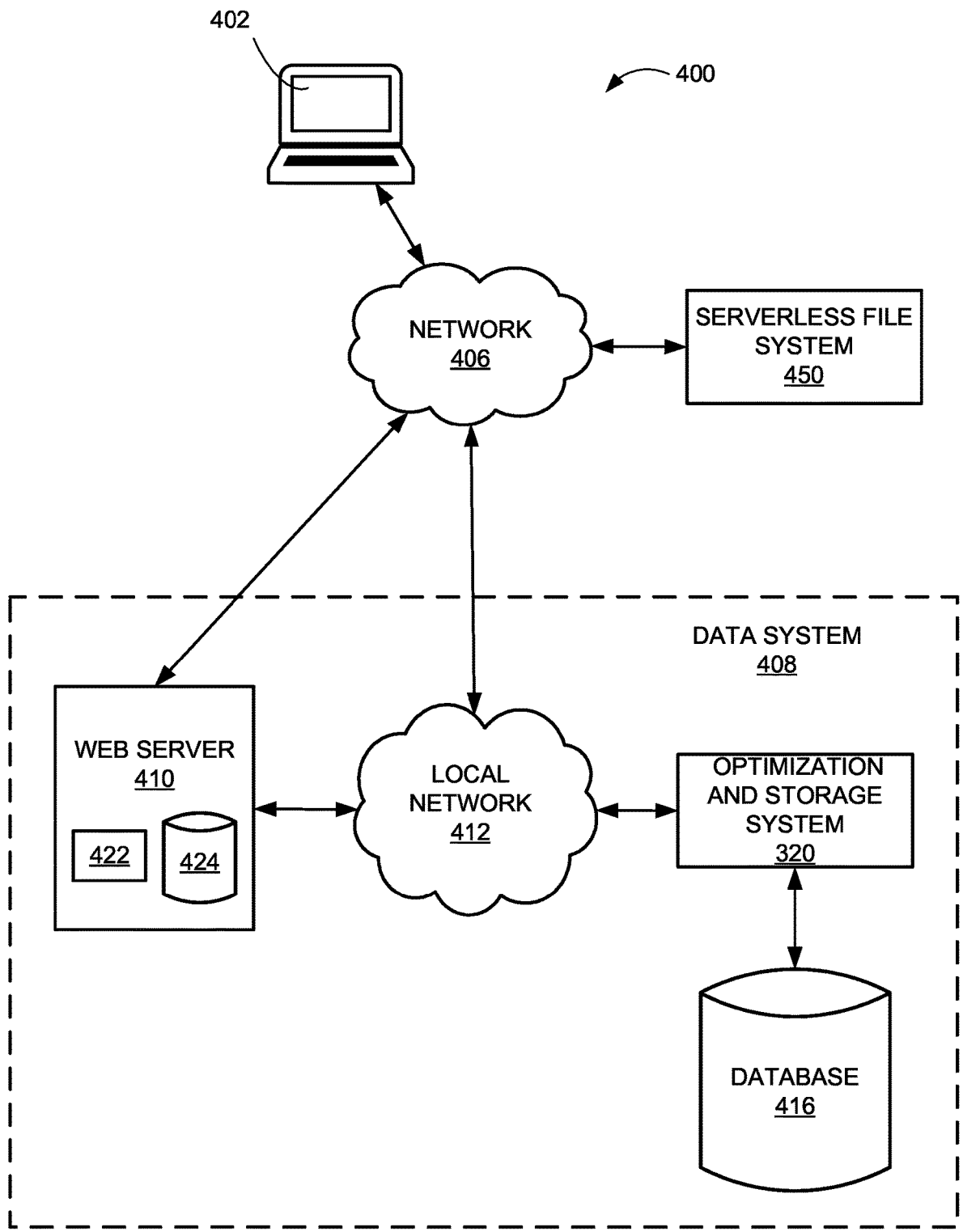
FIG. 4 is a block diagram of an example system that may be used to provide optimizing data for a serverless file system, according to an example implementation of the disclosed technology.

FIG. 3 is a block diagram of an example optimization and storage system 320 used to optimize data for a serverless file system 450 according to an example implementation of the disclosed technology. According to some embodiments, the user device 402 and web server 410, as depicted in FIG. 4 and described below, may have a similar structure and components that are similar to those described with respect to optimization and storage system 320 shown in FIG. 3. As shown, the optimization and storage system 320 may include a processor 310, an input/output (I/O) device 370, a memory 330 containing an operating system (OS) 340 and a program 350. In certain example implementations, the optimization and storage system 320 may be a single server or may be configured as a distributed computer system including multiple servers or computers that interoperate to perform one or more of the processes and functionalities associated with the disclosed embodiments. In some embodiments optimization and storage system 320 may be one or more servers from a serverless or scaling server system. In some embodiments, the optimization and storage system 320 may further include a peripheral interface, a transceiver, a mobile network interface in communication with the processor 310, a bus configured to facilitate communication between the various components of the optimization and storage system 320, and a power source configured to power one or more components of the optimization and storage system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, Zig-Bee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the optimization and storage system 320 may include one or more storage devices configured to store information used by the processor 310 (or other components) to perform certain functions related to the disclosed embodiments. In one example, the optimization and storage system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The optimization and storage system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the optimization and storage system 320 may include the memory 330 that may include one or more programs 350 to perform one or more functions of the disclosed embodiments. For example, in some embodiments, the optimization and storage system 320 may receive input data, determine whether the input data is appropriate for optimization, optimize the input data to reduce a size to create optimized data, group the optimized data, apply metadata, versioning and/or tags to the optimized data, apply governance and compliance requirements to the optimized data, store the optimized data in a data repository, receive an input to upload the optimized data to a serverless file system 450, upload the optimized data to the serverless file system 450 and update the metadata of the optimized data to indicate a new location at which the optimized data is stored on the serverless file system 450 as described above with respect to methods 100 and 200.

According to some embodiments, the optimization and storage system 320 may generate various graphical user interfaces that, for example, allow a user (e.g., via user device 402) to interact with the optimization and storage system 320 to submit input data to be optimized, to search for previously optimized data that may be stored in the data repository, to cause selected optimized data to be uploaded from the data repository to the serverless file system 450, and/or to receive notification of or access to optimized data that was already previously uploaded to the serverless file system 450. Optimization and storage system 320 may generate computer code for rendering and operating one or more interactive graphical user interfaces and may execute, or transmit the code to another device for execution, to render the graphical user interfaces on a display of the optimization and storage system 320, the web server 410, a user device 402 or any other suitable device.

According to some embodiments, the optimization and storage system 320 may train and/or utilize one or more machine learning models to perform various functions described herein. For example, in some embodiments, the optimization and storage system 320 may train a machine learning model to complete language-specific optimizations of input data to create optimized data. In other words, such a model may receive input data as an input, and then may output an optimized version of the input data in which language-specific optimizations have been applied to the data to reduce the overall size of the data. Such a model may be trained using prior examples of input data and optimized data as training data.

The processor 310 may execute one or more programs 350 located remotely from the optimization and storage system 320. For example, the optimization and storage system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include an optimization and storage system database 360 for storing related data to enable the optimization and storage system 320 to perform one or more of the processes and functionalities associated with the disclosed embodiments.

The optimization and storage system database 360 may include stored data relating to input data and/or input data that has been optimized as described herein. According to some embodiments, the functions provided by the optimization and storage system database 360 may also be provided by a database that is external to the optimization and storage system 320, such as the database 416 as shown in FIG. 4. According to some embodiments either optimization and storage database 360 or the database 416 may serve as a data repository for optimized data as described herein.

The optimization and storage system 320 may also be communicatively connected to one or more memory devices (e.g., databases) locally or through a network. The remote memory devices may be configured to store information and may be accessed and/or managed by the optimization and storage system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The optimization and storage system 320 may also include one or more I/O devices 370 that may comprise one or more interfaces for receiving signals or input from devices and providing signals or output to one or more devices that allow data to be received and/or transmitted by the optimization and storage system 320. For example, the optimization and storage system 320 may include interface components, which may provide interfaces to one or more input devices, such as one or more keyboards, mouse devices, touch screens, track pads, trackballs, scroll wheels, digital cameras, microphones, sensors, and the like, that enable the optimization and storage system 320 to receive data from a user (such as, for example, via the user device 402).

In examples of the disclosed technology, the optimization and storage system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The optimization and storage system 320 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The optimization and storage system 320 may be configured to adjust model parameters during training. Model parameters may include weights, coefficients, offsets, or the like. Training may be supervised or unsupervised.

The optimization and storage system 320 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The optimization and storage system 320 may be configured to optimize statistical models using known optimization techniques.

Furthermore, the optimization and storage system 320 may include programs configured to retrieve, store, and/or analyze properties of data models and datasets. For example, optimization and storage system 320 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The optimization and storage system 320 may include algorithms to determine a data type, key-value pairs, row-column data structure, statistical distributions of information such as keys or values, or other property of a data schema may be configured to return a statistical profile of a dataset (e.g., using a data-profiling model). The optimization and storage system 320 may be configured to implement univariate and multivariate statistical methods. The optimization and storage system 320 may include a regression model, a Bayesian model, a statistical model, a linear discriminant analysis model, or other classification model configured to determine one or more descriptive metrics of a dataset. For example, optimization and storage system 320 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The optimization and storage system 320 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, optimization and storage system 320 may be configured to generate a similarity metric representing a measure of similarity between data in a dataset. A similarity metric may be based on a correlation, covariance matrix, a variance, a frequency of overlapping values, or other measure of statistical similarity.

The optimization and storage system 320 may be configured to generate a similarity metric based on data model output, including data model output representing a property of the data model. For example, optimization and storage system 320 may be configured to generate a similarity metric based on activation function values, embedding layer structure and/or outputs, convolution results, entropy, loss functions, model training data, or other data model output). For example, a synthetic data model may produce first data model output based on a first dataset and produce second data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The optimization and storage system 320 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. In addition, or alternatively, the edge data may indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The optimization and storage system 320 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, optimization and storage system 320 is configured to generate and/or train a classification model to classify a dataset, consistent with disclosed embodiments.

While the optimization and storage system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the optimization and storage system 320 may include a greater or lesser number of components than those illustrated.

FIG. 4 is a block diagram of an example system that may be used to view and interact with data system 408, according to an example implementation of the disclosed technology. The components and arrangements shown in FIG. 4 are not intended to limit the disclosed embodiments as the components used to implement the disclosed processes and features may vary. As shown, data system 408 may interact with a user device 402 and/or the serverless file system 450 via a network 406. In certain example implementations, the data system 408 may include a local network 412, an optimization and storage system 320, a web server 410, and a database 416.

In some embodiments, a user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the data system 408. In some embodiments, the user device 402 may include or incorporate electronic communication devices for hearing or vision impaired users.

Users may include individuals who may be associated with an organization, such as employees of the organization, who may seek to utilize the optimization and storage system 320 to assist them in optimizing data/software code for upload to a serverless file system 450, so that the data/software code can be utilized in software deployments. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

As shown in FIG. 4, the data system 408 may further interact with a serverless file system 450. A serverless file system 450 may represent one or more servers of an online provider of website hosting, networking, cloud, or backup services, such as Microsoft Azure™ or Amazon Web Services™. The serverless file system 450 may be configured to receive and store data from data system 408 via network 406 and may also be configured to communicate with one or more user devices 402 via network 406. According to some embodiments, the serverless file system 450 may allow for uploading chunks of data, such as Lambda layers to AWS, which may have a size restriction. In other words, the serverless file system 450 may prevent optimization and storage system 320 from uploading chunks of data that exceed a maximum size limit, such as, for example, 250 megabytes. Accordingly, in some embodiments, optimization and storage system 320 may be configured to reduce the size of a set of input data that originally exceeded the maximum size limit of the serverless file system 450 via an optimization process to produce optimized data of a smaller size that is below the maximum size limit and may thus be uploaded to the serverless file system 450. According to some embodiments, the serverless file system 450 may include a plurality of different servers that may be in different geographic locations and/or time zones and servers that provide redundancy and/or mirroring. Thus, in some embodiments, a particular chunk of data that is uploaded to the serverless file system 450 by the optimization and storage system 320 may be stored on multiple different servers. The serverless file system 450 may provide the optimization and storage system 320 with an indication of each location within the serverless file system 450 that each set of uploaded data is stored, which may allow the optimization and storage system 320 to store a record of the storage locations of each uploaded chunk of data (e.g., in the metadata associated with each chunk of data stored in the data repository). The serverless file system 450 may allow uploaded chunks of data to selectively be deployed in response to a command (e.g., submitted via a user device 402) from an authorized user.

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The data system 408 may be associated with and optionally controlled by one or more entities such as a business, corporation, individual, partnership, or any other entity that provides one or more of goods, services, and consultations to individuals such as customers. In some embodiments, the data system 408 may be controlled by a third party on behalf of another business, corporation, individual, partnership, etc. The data system 408 may include one or more servers and computer systems for performing one or more functions associated with products and/or services that the organization provides.

Web server 410 may include a computer system configured to generate and provide one or more websites accessible to customers, as well as any other individuals involved in access system 408's normal operations. Web server 410 may include a computer system configured to receive communications from user device 402 via, for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that is authenticated by the optimization and storage system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™M or Amazon Web Services™M. According to some embodiments, the web server 410 may act as an intermediary for communications between a user device 402 and the optimization and storage system 320. For example, the web server 410 may host a website that displays one or more graphical user interfaces generated based on data provided by the optimization and storage system 320 that a user may access and interact with using a user device 402.

The local network 412 may include any type of computer networking arrangement used to exchange data in a localized area, such as WiFi, Bluetooth™, Ethernet, and other suitable network connections that enable components of the data system 408 to interact with one another and to connect to the network 406 for interacting with components in the system 400 environment. In some embodiments, the local network 412 may include an interface for communicating with or linking to the network 406. In other embodiments, certain components of the data system 408 may communicate via the network 406, without a separate local network 406.

The data system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access data system 408 using the cloud computing environment. User device 402 may be able to access data system 408 using specialized software. The cloud computing environment may eliminate the need to install specialized software on user device 402.

In accordance with certain example implementations of the disclosed technology, the data system 408 may include one or more computer systems configured to compile data from a plurality of sources such as the optimization and storage system 320, web server 410, and/or the database 416. The optimization and storage system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Although the preceding description describes various functions of a web server 410, a optimization and storage system 320, a database 416, a serverless file system 450, and a user device 402, in some embodiments, some or all of these functions may be carried out by a single computing device.

Example Use Case

The following example use case describes an example of a typical user flow pattern. This section is intended solely for explanatory purposes and not in limitation.

In one example, an employee of a company may desire to utilize a set of data or software code in a software deployment from a serverless file system (e.g., serverless file system 450), such as for example, AWS. As it can be quite expensive to host software in a serverless file system, the employee may not know whether the desired set of data is already being hosted by the serverless file system and the serverless file system may not provide search functionality. Furthermore, the serverless file system may have certain application requirements and the employer may have its own policies or regulation compliance requirements that are not specifically enforced by the serverless file system. Therefore, the employee can search an offline data repository (e.g., data system 408) that is maintained by the company (e.g., it is not part of the serverless file system) to determine whether the desired data set has already been uploaded to the serverless file system already or not by searching by aspects of the data stored in the repository (e.g., search by tags, creation date, version, last user who modified, etc.). If the user locates the desired data set in the data repository, the metadata associated with the stored data set may indicate whether the data set has previously already been uploaded to the serverless file system and if so, at what locations within the serverless file system the data set is stored so that the user can easily access and utilize it. If the user locates the desired data set in the data repository but the metadata associated with the data set indicates that the data set has not yet been uploaded to the serverless file system, then the user can cause the system to upload the desired data set to the serverless file system so that it can be utilized. If the user is unable to find the desired data set in the data repository, the user may utilize the system (e.g., via optimization and storage system 320) to prepare the data set for upload to the serverless file system. The user can select the desired data set as input and the system may automatically determine whether the input data requires optimization, and if so, may automatically optimize the data so that the size of the data is below a maximum allowed data size of the serverless file system. The system may automatically perform other optimization and management functions by first analyzing the data, using a machine learning model, to extract information (e.g., file types, programming languages, test folders, version, package size, etc.), optimizing the data using the analysis, such as by deleting unneeded files, and grouping and packaging libraries, applying metadata, tags and versioning, and applying enterprise governance and compliance requirements to the data. The system may store the optimized data in the data repository so that future users may search for it and may, at the user's direction, cause the optimized data to be uploaded to the serverless file system. Thus, the system may automatically convert data that was previously too large to be uploaded to the serverless file system into a form that is capable of being uploaded to the serverless file system, while simultaneously adding features to the data that allow for greater usability of the data, such as metadata, tags, governance and compliance requirements.

In some examples, disclosed systems or methods may involve one or more of the following clauses:

Clause 1: A serverless file library optimization and storage system comprising: one or more processors; memory in communication with the one or more processors and storing instructions that are configured to cause the system to: receive input data; determine whether the input data is appropriate for optimization; responsive to determining that the input data is appropriate for optimization: optimize the input data to reduce a size to create optimized data; group the optimized data; apply metadata to the optimized data, wherein the metadata is configured to accommodate an indication of all locations the optimized data is stored in a serverless file system; apply enterprise governance and compliance requirements to the optimized data; store the optimized data in a data repository; receive an input to upload the optimized data to the serverless file system; determine, from the metadata, whether the optimized data is stored in the serverless file system; responsive to determining that the optimized data is not stored in the serverless file system: upload, via an application programming interface, to the serverless file system, the optimized data; and update the metadata of the optimized data to indicate a new location at which the optimized data is stored on the serverless file system.

Clause 2: The system of clause 1, wherein determining whether the input data is appropriate for optimization comprises: identifying whether one or more dependencies exist; responsive to identifying that the one or more dependencies exist: determining whether a sum of a total size of the one or more dependencies is greater than 50 megabytes and less than 250 megabytes; and responsive to determining that the sum of the total size of the one or more dependencies is greater than 50 megabytes and less than 250 megabytes: determining that the input data is appropriate for the system.

Clause 3: The system of clause 1, wherein optimizing the input data further comprises: determining a programming language of the input data; responsive to determining the programming language of the input data: completing language-specific size optimizations of the input data; stripping object symbols from .so files; deleting test folders; and compressing the input data.

Clause 4: The system of clause 3, wherein the memory stores further instructions that are configured to cause the system to: responsive to determining that the optimized data is not stored in the serverless file system: decompress the optimized data.

Clause 5: The system of clause 4, wherein optimizing the input data is completed by a first machine learning model, wherein the first machine learning model is trained to complete language-specific optimization of the input data based on prior examples of the input data and the optimized data.

Clause 6: The system of clause 3, wherein completing the language-specific size optimizations of the input data comprises deleting object files in python, minifying files in JavaScript, or combinations thereof.

Clause 7: The system of clause 1, wherein grouping the optimized data comprises: locating dependencies in the optimized data; and grouping, using heuristics, the optimized data such that inputs and outputs of the dependencies are located in a proximity to one another.

Clause 8: The system of clause 7, wherein the grouping of the optimized data is completed by a second machine learning model based on prior examples of the input data and the optimized data.

Clause 9: The system of clause 1, wherein the memory stores further instructions that are configured to cause the system to: responsive to determining that the optimized data is stored in the serverless file system: reference the optimized data in the serverless file system.

Clause 10: A serverless file library optimization and storage system comprising: one or more processors; memory in communication with the one or more processors and storing instructions that are configured to cause the system to: receive input data; determine whether the input data is appropriate for optimization; responsive to determining that the input data is appropriate for optimization: optimize the input data to reduce a size to create optimized data; group the optimized data; apply metadata to the optimized data, wherein the metadata is configured to accommodate an indication of all locations the optimized data is stored in a serverless file system; apply enterprise governance and compliance requirements to the optimized data; store the optimized data in a data repository; generate a first graphical user interface comprising search input terms; transmit the first graphical user interface to a user device; receive a search command from the user device; generate, based on the search command and the metadata, an interactive search list, wherein the interactive search list shows results including the optimized data; generate a second graphical user interface comprising the interactive search list; transmit the second graphical user interface to the user device; and receive a selection from the user device indicating to upload the optimized data.

Clause 11: The system of clause 10, wherein the results are entries further comprising information regarding the entry, an architecture, a last updated date, contributors, or combinations thereof.

Clause 12: The system of clause 10, wherein the interactive search list further comprises filters used to sort results and access control limitations that require user authentication to view certain results.

Clause 13: The system of clause 10, wherein the memory stores further instructions that are configured to cause the system to: upload, via an application programming interface, to the serverless file system, the optimized data.

Clause 14: The system of clause 10, wherein the memory stores further instructions that are configured to cause the system to: determine, from the metadata, whether the optimized data is stored in the serverless file system; responsive to determining that the optimized data is not stored in the serverless file system: upload, via an application programming interface, to the serverless file system, the optimized data; update the metadata of the optimized data to indicate a new location at which the optimized data is stored on the serverless file system; and responsive to determining that the optimized data is stored in the serverless file system: reference the optimized data in the serverless file system.

Clause 15: The system of clause 10, wherein optimizing the input data is completed by a first machine learning model, wherein the first machine learning model, based on the input data, completes language-specific optimizations of the input data to create optimized data based on prior examples of the input data and the optimized data.

Clause 16: A serverless file library optimization and storage system comprising: one or more processors; memory in communication with the one or more processors and storing instructions that are configured to cause the system to: receive input data; optimize the input data to reduce a size to create optimized data; group the optimized data; apply metadata to the optimized data, wherein the metadata is configured to accommodate an indication of all locations the optimized data is stored in a serverless file system; apply enterprise governance and compliance requirements to the optimized data; store the optimized data in a data repository; generate a first graphical user interface comprising search input terms; transmit the first graphical user interface to a user device; receive a search command from the user device; generate, based on the search command and the metadata, an interactive search list, wherein the interactive search list shows results including the optimized data; generate a second graphical user interface comprising the interactive search list; transmit the second graphical user interface to the user device; receive an input from the user device to upload the optimized data to the serverless file system; determine, from the metadata, whether the optimized data is stored in the serverless file system; responsive to determining that the optimized data is not stored in the serverless file system: upload, via an application programming interface, to the serverless file system, the optimized data; and update the metadata of the optimized data to indicate a new location at which the optimized data is stored on the serverless file system.

Clause 17: The system of clause 16, wherein optimizing the input data is completed by a first machine learning model, wherein the first machine learning model, based on the input data, completes language-specific optimizations of the input data to create optimized data based on prior examples of the input data and the optimized data.

Clause 18: The system of clause 16, wherein the memory stores further instructions that are configured to cause the system to: responsive to determining that the optimized data is not stored in the serverless file system: generate a third graphical user interface indicating that the optimized data has been uploaded to the serverless file system and the new location at which the optimized data is stored; and transmit the third graphical user interface to the user device.

Clause 19: The system of clause 16, wherein the memory stores further instructions that are configured to cause the system to: responsive to determining that the optimized data is stored in the serverless file system: reference the optimized data in the serverless file system; generate a fourth graphical user interface indicating that the optimized data was already uploaded to the serverless file system and was referenced instead of reuploaded; and transmit the fourth graphical user interface to the user device.

Clause 20: The system of clause 16, wherein applying the enterprise governance and the compliance requirements further comprises verifying security requirements and license needs for the optimized data.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   one or more processors;
   memory in communication with the one or more processors and storing instructions that are configured to cause the system to:
   receive input data;
   determine a maximum size threshold based on an upload size restriction of a serverless file system and an expected percentage in data reduction from optimizing data for upload to the serverless file system;
   automatically determine whether the input data is appropriate for optimization by comparing a size of the input data to a minimum size threshold and the maximum size threshold;
   responsive to determining that the input data is appropriate for optimization:
      optimize the input data to reduce a size to create optimized data;
      group the optimized data;
      apply metadata to the optimized data, wherein the metadata is configured to accommodate an indication of all locations the optimized data is stored in the serverless file system;
      apply enterprise governance and compliance requirements to the optimized data;
      store the optimized data and the metadata in a data repository, the data repository being configured to locally store optimized data in a condition to be uploaded to the serverless file system upon command;
receive an input to upload the optimized data to the serverless file system;
determine, from the metadata, whether the optimized data is stored in the serverless file system;
responsive to determining that the optimized data is not stored in the serverless file system:
upload, from the data repository and via an application programming interface, to the serverless file system, the optimized data; and
update, in the data repository, the metadata associated with the optimized data that is stored in the data repository to indicate a new location at which the optimized data is stored on the serverless file system.

2. The system of claim 1, wherein determining whether the input data is appropriate for optimization comprises:
identifying whether one or more dependencies exist;
responsive to identifying that the one or more dependencies exist:
determining whether a sum of a total size of the one or more dependencies is greater than 50 megabytes and less than 250 megabytes; and
responsive to determining that the sum of the total size of the one or more dependencies is greater than 50 megabytes and less than 250 megabytes: determining that the input data is appropriate for optimization.

3. The system of claim 1, wherein optimizing the input data further comprises:
determining a programming language of the input data;
responsive to determining the programming language of the input data:
completing language-specific size optimizations of the input data;
stripping object symbols from .so files;
deleting test folders; and
compressing the input data.

4. The system of claim 3, wherein the memory stores further instructions that are configured to cause the system to: responsive to determining that the optimized data is not stored in the serverless file system:
decompress the optimized data.

5. The system of claim 4, wherein optimizing the input data is completed by a first machine learning model, wherein the first machine learning model is trained to complete language-specific optimization of the input data based on prior examples of the input data and the optimized data.

6. The system of claim 3, wherein completing the language-specific size optimizations of the input data comprises deleting object files in python, minifying files in JavaScript, or combinations thereof.

7. The system of claim 1, wherein grouping the optimized data comprises:
locating dependencies in the optimized data; and
grouping, using heuristics, the optimized data such that inputs and outputs of the dependencies are located in a proximity to one another.

8. The system of claim 7, wherein the grouping of the optimized data is completed by a second machine learning model based on prior examples of the input data and the optimized data.

9. The system of claim 1, wherein the memory stores further instructions that are configured to cause the system to:
responsive to determining that the optimized data is stored in the serverless file system:
reference the optimized data in the serverless file system.

10. A system comprising:
one or more processors;
memory in communication with the one or more processors and storing instructions that are configured to cause the system to:
receive input data;
determine a maximum size threshold based on an upload size restriction of a serverless file system and an expected percentage in data reduction from optimizing data for upload to the serverless file system;
automatically determine whether the input data is appropriate for optimization by comparing a size of the input data to a minimum size threshold and the maximum size threshold;
responsive to determining that the input data is appropriate for optimization:
optimize the input data to reduce a size to create optimized data;
group the optimized data;
apply metadata to the optimized data, wherein the metadata is configured to accommodate an indication of all locations the optimized data is stored in the serverless file system;
apply enterprise governance and compliance requirements to the optimized data;
store the optimized data and the metadata in a data repository, the data repository being configured to locally store optimized data in a condition to be uploaded to the serverless file system upon command;
generate a first graphical user interface comprising search input terms;
transmit the first graphical user interface to a user device;
receive a search command from the user device;
generate, based on the search command and the metadata, an interactive search list, wherein the interactive search list shows results including the optimized data;
generate a second graphical user interface comprising the interactive search list;
transmit the second graphical user interface to the user device; and
receive a selection from the user device indicating to upload the optimized data.

11. The system of claim 10, wherein the results are entries further comprising information regarding the entry, an architecture, a last updated date, contributors, or combinations thereof.

12. The system of claim 10, wherein the interactive search list further comprises filters used to sort results and access control limitations that require user authentication to view certain results.

13. The system of claim 10, wherein the memory stores further instructions that are configured to cause the system to:
upload, via an application programming interface, to the serverless file system, the optimized data.

14. The system of claim 10, wherein the memory stores further instructions that are configured to cause the system to:
determine, from the metadata, whether the optimized data is stored in the serverless file system;

responsive to determining that the optimized data is not stored in the serverless file system:
   upload, via an application programming interface, to the serverless file system, the optimized data;
   update the metadata of the optimized data to indicate a new location at which the optimized data is stored on the serverless file system; and
responsive to determining that the optimized data is stored in the serverless file system:
   reference the optimized data in the serverless file system.

15. The system of claim 10, wherein optimizing the input data is completed by a first machine learning model, wherein the first machine learning model, based on the input data, completes language-specific optimizations of the input data to create optimized data based on prior examples of the input data and the optimized data.

16. A system comprising:
one or more processors;
memory in communication with the one or more processors and storing instructions that are configured to cause the system to:
   receive input data;
   optimize the input data to reduce a size to create optimized data;
   group the optimized data;
   apply metadata to the optimized data, wherein the metadata is configured to accommodate an indication of all locations the optimized data is stored in a serverless file system;
   apply enterprise governance and compliance requirements to the optimized data;
   store the optimized data and the metadata in a data repository, the data repository being configured to locally store optimized data in a condition to be uploaded to the serverless file system upon command based on the optimized data having a file size less than an upload size restriction of the serverless file system;
   generate a first graphical user interface comprising search input terms;
   transmit the first graphical user interface to a user device;
   receive a search command from the user device;
   generate, based on the search command and the metadata, an interactive search list, wherein the interactive search list shows results including the optimized data;
   generate a second graphical user interface comprising the interactive search list;
   transmit the second graphical user interface to the user device;
   receive an input from the user device to upload the optimized data to the serverless file system;
   determine, from the metadata, whether the optimized data is stored in the serverless file system;
   responsive to determining that the optimized data is not stored in the serverless file system:
      upload, from the data repository and via an application programming interface, to the serverless file system, the optimized data; and
      update, in the data repository, the metadata associated with the optimized data that is stored in the data repository to indicate a new location at which the optimized data is stored on the serverless file system.

17. The system of claim 16, wherein optimizing the input data is completed by a first machine learning model, wherein the first machine learning model, based on the input data, completes language-specific optimizations of the input data to create optimized data based on prior examples of the input data and the optimized data.

18. The system of claim 16, wherein the memory stores further instructions that are configured to cause the system to: responsive to determining that the optimized data is not stored in the serverless file system:
   generate a third graphical user interface indicating that the optimized data has been uploaded to the serverless file system and the new location at which the optimized data is stored; and
   transmit the third graphical user interface to the user device.

19. The system of claim 16, wherein the memory stores further instructions that are configured to cause the system to:
   responsive to determining that the optimized data is stored in the serverless file system:
      reference the optimized data in the serverless file system;
      generate a fourth graphical user interface indicating that the optimized data was already uploaded to the serverless file system and was referenced instead of reuploaded; and
      transmit the fourth graphical user interface to the user device.

20. The system of claim 16, wherein applying the enterprise governance and the compliance requirements further comprises verifying security requirements and license needs for the optimized data.

* * * * *